United States Patent [19]

Nowak et al.

[11] Patent Number: 5,116,030
[45] Date of Patent: May 26, 1992

[54] VIBRATION ISOLATOR

[75] Inventors: Theodore J. Nowak; Gary P. Tillman, both of Erie, Pa.

[73] Assignee: Lord Corporation, Erie, Pa.

[21] Appl. No.: 332,368

[22] Filed: Mar. 30, 1989

Related U.S. Application Data

[63] Continuation of Ser. No. 71,697, Jul. 9, 1987, abandoned.

[51] Int. Cl.$^5$ .............................................. F16F 7/00
[52] U.S. Cl. .............................. 267/140.4; 267/141.7
[58] Field of Search .............. 248/560, 568, 634, 635; 267/141, 141.1, 141.2, 141.3, 141.4, 141.5, 141.7, 140.4

[56] References Cited

U.S. PATENT DOCUMENTS

| | | |
|---|---|---|
| 2,295,829 | 11/1940 | Carlson . |
| 2,539,443 | 6/1945 | Lee . |
| 2,540,130 | 1/1945 | Lee . |
| 2,739,774 | 3/1956 | Crede . |
| 2,781,990 | 2/1957 | Via .................... 267/141.7 |
| 2,900,162 | 8/1959 | Crede et al. . |
| 2,917,265 | 12/1959 | Markowski . |
| 3,323,764 | 6/1967 | Johnson . |
| 3,399,851 | 9/1968 | Racca . |

FOREIGN PATENT DOCUMENTS

| | | | |
|---|---|---|---|
| 1111030 | 10/1955 | France ............................. | 267/141.3 |
| 796231 | 6/1958 | United Kingdom ............. | 267/141.3 |
| 896762 | 5/1962 | United Kingdom ............. | 267/141.5 |

OTHER PUBLICATIONS

"Rubber For the Absorption of Vibration" by J. F. Downie Smith pp. 37 & 49.
Barry Controls Publication Bulletin CB-184 pp. D9-D14.
Natural Rubber Development Board—p. 73.

*Primary Examiner*—Robert J. Oberlitner
*Attorney, Agent, or Firm*—Howson and Howson

[57] ABSTRACT

A vibration isolator has a first and second elastomeric section such that the first elastomeric section is bonded between a rigid inner member and rigid intermediate member and the second elastomeric member is bonded between the intermediate and a rigid cap plate. The first and second elastomeric sections are oriented at an angle from about 45° to about 60° to the axial axis of the isolator. Such a vibration can be used in mountings where loads are applied in axial or radial directions.

3 Claims, 1 Drawing Sheet

VIBRATION ISOLATOR

This application is a continuation of application Ser. No. 07/071,697 filed Jul. 9, 1987, now abandoned.

FIELD OF THE INVENTION

The present invention relates to shock and vibration protective devices, and more particularly, relates to such protective devices for isolating and protecting supported members, such as an electronic box containing components, from harmful and sometimes destructive effects of vibratory and/or shock forces to which such supported members may be subjected.

BACKGROUND OF THE INVENTION

Moving vehicles such as automobiles, trucks, aircraft, missiles, ships and rail vehicles carry components that require protection against severe shock from impact caused by rough terrain or other disturbances as the case may require. Such components include vehicle electronics, motors, fans, machinery, transformers, shipping containers, railroad equipment, pumps, numerical control equipment and aircraft/missile electronics. Generally such protection is provided by a vibration isolator or a similar component.

One function of a vibration isolator is to provide a means whereby a component is protected against handling impact loads being transmitted from a base or frame of a vehicle such as an aircraft on which the component may be mounted. Protection against such loads is usually accomplished by storing energy within a resilient medium and then releasing such energy at a relatively slower rate. Generally, such isolators comprise a rubber member which, together with the mass of the mechanism which it supports, has a natural frequency that is sufficiently lower from that of the disturbing force so as to bring about a minimum transient response of the supported mechanism, and yet have sufficient static load-carrying capacity to support the load of such mechanism. Correct matching of a vibration isolator to specific application is essential; for example, a given vibration isolator may be effective in a case where the mechanism is to be subjected to a relatively high magnitude of loading within a short time interval and yet may tend to magnify the shock where the mechanism is to be subjected to a loading of considerably smaller magnitude but with a longer time interval.

As used herein, the term "vibration" is used to describe a continuing periodic change in the magnitude of a displacement with respect to a specified central reference point. Also, as used herein, the term "mechanical vibration" is used to describe the continuing periodic motion of a solid body at any frequency. In most cases, mechanical vibration may be isolated by placing a resilient medium between the source of vibration and a protected unit to reduce the magnitude of the force transmitted from a structure to its support or, alternatively, to reduce the magnitude of motion transmitted from a vibrating support to the structure. One of the prime considerations in the isolation of vibration is the proper use of a vibration isolator under various load configurations with respect to the loading of such vibration isolator, the desired natural frequency, the position and location of the vibration isolator and the relationship of the structural response of equipment to which such isolator is attached.

It can be shown that for a vibration isolator to be effective, the natural frequency thereof should be less than 40% of the frequency of the disturbing source. Those skilled in the art will recognize that the natural frequency is the frequency at which a freely vibrating mass system will oscillate once it has been disturbed. There are many instances where equipment must operate over a fairly wide frequency range, for example, as in aircraft where vibrations may occur in the range from 5 to in excess of 2000 Hertz. In many instances, the equipment will thus be subjected to lower frequencies initially; will pass through a condition known as resonance or resonant frequency; and may be designed for normal operation at a frequency which is considerably higher than the resonant frequency. As used herein, resonance exists when the natural frequency of a mass support on a vibration isolator coincides with the frequency of the disturbing vibratory forces; and resonant frequency means that frequency at which such coincidence occurs.

A condition of resonance causes magnification of the disturbing vibratory forces and may be harmful, and sometimes destructive, to equipment subjected to such forces unless proper controls can be effected. To provide such controls, the resilient medium of a vibration support must be provided with suitable damping. While vibration damping is helpful under conditions of resonance, it may be detrimental in some instances to a system at frequencies above the resonant frequency.

A stated factor that must be considered in the selection of a vibration isolator is its configuration and the type of loads it will be required to support. In particular, the loads may be in compression, shear or tension direction or combinations thereof. For example in a vibration isolator having a configuration with elastomer bonded between two rigid plates, the mounted component exerts only a static gravitational downward force onto the support. Such a vibration isolator will mostly experience a load support in compression with some combination of induced shear loads. If the vibration isolators are installed above the supported protected components, then each vibration isolator will mostly experience a tension load with some induced shear loading. If the vibration isolators are mounted to the side of the supported protected components, each vibration isolator will mostly experience a load supported in shear with possible compression and tension load.

However, in many applications the vibration isolators will experience all the modes of loading or combinations thereof. In particular, the vibration isolator will not only have to support the protected component, but will also have to hold it to the structure wherein the vibration isolator is in tension or help the protected component from shifting wherein the vibration isolator is in shear. This invention is directed to the case wherein various types of loads including compression, shear or tension modes or combinations are incurred by the vibration isolator. Furthermore, it would be advantageous to have one mount design that could simultaneously accommodate all modes of loads.

BRIEF DESCRIPTION OF PRIOR ART

One type of vibration isolator used to support protected components that incur various types of loads has an inner, intermediate and outer rigid members with a first elastomer disposed between the inner and intermediate members and a second elastomer disposed between the intermediate and outer members wherein the elastomeric members are not bonded to the rigid members. As a result of the lack of bonding, dynamic characteristics are not truly predictable since they vary due to rubber to metal interface slippage conditions such as moisture, oil contamination, surface roughness, etc. Furthermore such unbonded mounts accommodate loads primarily in elastomeric compression. As such, there are response abnormalities associated with first or second elastomeric sections lifting off at higher dynamic excursions.

Barry Controls publication Bulletin CB-184 (Application/Selection Guide) at pages D9-D14 and U.S. Pat. Nos. 3,323,764; 2,539,443; 3,399,851; 2,900,162; 2,917,265 and 2,295,829 are illustrative of vibration isolators of the aforedescribed type which utilize unbonded elastomeric sections between the rigid members. U.S. Pat. No. 2,540,130 disclose a fluid filled vibration isolator wherein the elastomeric elements are bonded to the metal members. The bonding is necessary in this case otherwise the fluid would leak from the mount.

While the aforedescribed vibration isolators may function satisfactorily for its intended purpose, there is not currently available a fully unitized vibration isolator capable of accepting loads in compression, tension and shear mode of loads.

OBJECTS OF THE INVENTION

With the foregoing in mind, a primary object of the present invention is to provide a novel vibration isolator particularly suited for use in supporting a protected component wherein the vibration isolator is subjected to combined compression, shear and tension modes of loads in a low profile device which is failsafe in construction.

Another object of the present invention is to provide an improved fully bonded vibration isolator capable of incurring compression, shear and tension modes of loads internally while maintaining uniform characteristics regardless of direction of the load.

A further object of the present invention is to provide a vibration isolator that is effective in reducing vibration and shock forces to supported equipment.

SUMMARY OF THE INVENTION

More specifically, the present invention provides an improved fully bonded vibration isolator particularly suited for protecting components wherein the loads between the components and a support structural member may be in the axial or radial directions of the isolator inducing internal compression, shear or tension loads within the isolator. The vibration isolator comprises a rigid inner member concentric about an axial axis, a rigid annular intermediate member wherein the inner and intermediate members are spaced to accommodate a first elastomeric section which is bonded to each of the inner and intermediate members; a rigid cap plate secured to said inner member wherein the cap plate has a radially outer surface section which is spaced from said intermediate member to accommodate a second elastomeric section which is bonded to each of the radially outer surface section and the intermediate member. Typically the inner member is fixedly attached to a protected component whereas the intermediate member is attached to a structural support device allowing said intermediate member to move relative to said unitized inner member and said cap plate.

The first elastomeric section and second elastomeric section are inclined at an angle to the axial axis from about 45° and 60° such that the vibration support is capable of varying the axial and radial stiffness of the vibration isolator.

BRIEF DESCRIPTION OF THE DRAWINGS

The foregoing and other objects, features and advantages of the present invention should become apparent from the following description, when taken in conjunction with the accompanying drawings, in which.

DESCRIPTION OF THE PREFERRED EMBODIMENT

Figure 1:
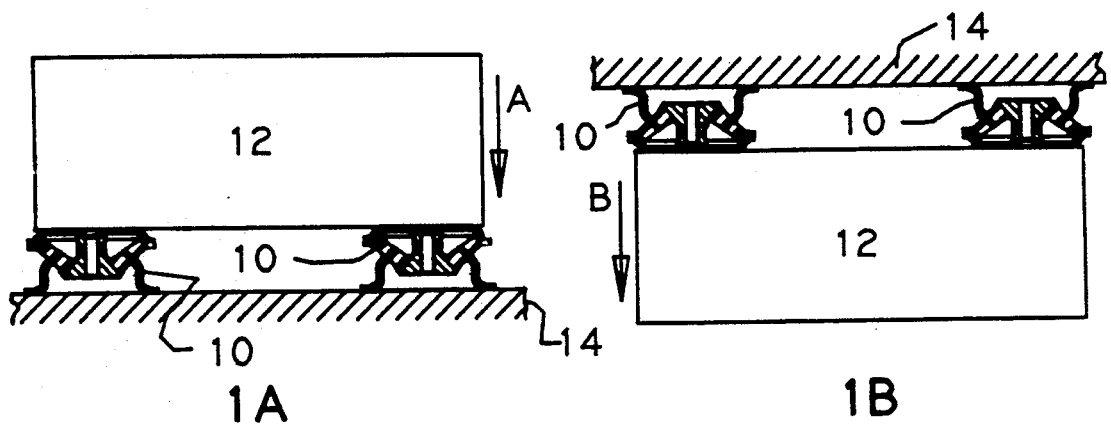
FIG. 1 is a view illustrating a protected component and a installation incorporating a plurality of vibration isolators of the present invention.
Figure 2:
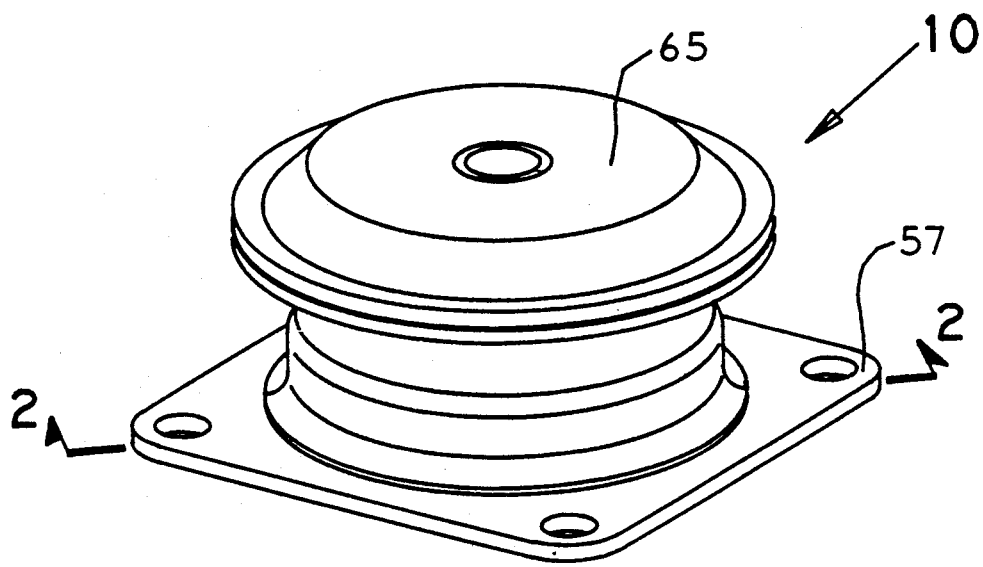
FIG. 2 is a perspective view illustrating the elements of the vibration isolator.

Referring now to the drawings, FIG. 1 illustrates two applications wherein vibration isolators embodying the present invention find particular utility. In the application as shown in FIG. 1A, a supported member 12 such as a component box of electronic components used in an aircraft, for example, are supported on a supporting member 14 such as a aircraft structure by vibration isolators depicted as 10 wherein the load exerted by the supported member 12 is a downward force onto the vibration isolators 10 as shown by arrow A. In FIG. 1B, the supported member 12 hangs from the supporting member 14, wherein the vibration isolators 10 incur a downward force from the supported member 12 as illustrated by arrow B.

The vibration isolator 10, according to the present invention, is capable of performing equally well being used in either of the illustrated locations or variations thereof. It is understood that, in some applications, the vibration isolators 10 may be mounted on the side of the supported member 12 or the supported member need not be shaped rectangularly.

As will be discussed more fully hereinafter, the vibration isolator 10 includes a first elastomeric section 20 and a second elastomeric section 22 for supporting loads and isolating vibration transmitted by a structure 14 on which the supported member 12 is mounted. As shown in FIG. 1A, the vibration mounts 10 support the supported member 12 against gravity and protect it against vibration. The orientation of the first and second elastomeric sections allow that the second elastomeric section 22 incurs compression and shear loads whereas the first elastomeric section 20 incurs tension and shear loads. As shown in FIG. 1B, the vibration isolators 10 support the supported member 12 wherein the gravity is away from the structure 14. The second elastomeric section 22 incurs tension and shear loads whereas the first elastomeric section 20 incurs compression and shear loads. As a result, the vibration isolator of the present invention is particularly well suited for accommodating all types of loads, including tension, compression, and shear loads, regardless of location of mounting.

Figure 3:
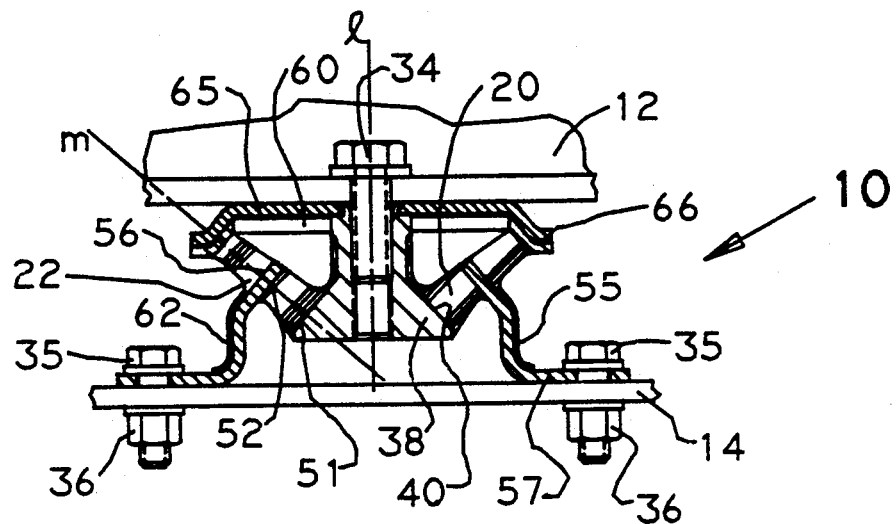
FIG. 3 is a sectional view taken along 2—2 of FIG. 2 to illustrate details of construction of the preferred vibration isolator.

Referring now to FIG. 3, the vibration isolator 10 is shown connecting a supported member 12, such as an electronics box, to a supporting member 14. The supported member 12 is attached to the vibration isolator 10 by a bolt 34, although other conventional means such as nuts, rivets or the like may be used. The bolt 34 secures the supported member 12 to the vibration isolator 10 being threadedly secured to an inner rigid member 38 which is concentric about an axial axis 1. Likewise, the vibration isolator 10 is attached to the supporting member 14 by a bolt 35 and nut 36, securely attached thereto, although other conventional devices may be used.

To accommodate the first elastomeric section 20, the inner member 38 has a first surface 40 that is inclined at an angle to the axial axis 1 from about 45° to about 30°, preferably from about 40° to about 33°. The first surface 40 is relatively smooth to accommodate bonding of one end 51 of the first elastomeric section 20 to the first surface 40. In the present embodiment, the elastomeric section 20 is bonded to the first surface 40 by an elastomer to metal adhesive, selected based on the type of elastomer and substrate used. For example for a steel substrate an elastomer comprising silicone, the adhesive might be Chemlok ® 608, Lord Corporation.

To accommodate loads in compression and tension, the first elastomeric section 20 is oriented such that an imaginary axis m as shown, is inclined at an angle to the axial axis 1 from about 45° to about 60° to the axial axis 1, preferably from about 50° to about 57°. The first elastomeric section 20 may be any suitable elastomer based on design requirements. The composition of rubber, angle of incline, size of the elastomeric sections are all dependent on specific designs whereby one skilled in the art would determine necessary design criteria.

The opposite end 52 of the first elastomeric section 20 is secured to an intermediate member 55, in particular to a conical section 56 of the intermediate member wherein the conical section 56 is inclined at an angle to the axial axis 1 from about 45° to about 30° preferably from about 40° to about 33°. As shown in FIG. 3, the intermediate member 55 also has a flat base portion 57 which is parallel to the surface of the supporting member and secured thereto. The intermediate member 55 is preferably concentric about the axial axis 1 and is located relative to said inner member 38 so that a space is formed to accommodate the first elastomeric section 20. The intermediate member 55 is made of rigid material such as steel, plastic or aluminum. The surface of the conic section 56 is sufficiently smooth to allow for bonding to the first elastomeric section 20, such as by a suitable adhesive described hereinabove.

To accommodate an equal but opposite load mode, the second elastomer section 22 is fixedly secured between the conical section 56 and a rigid cap plate 65 which has a radial outward surface section 66 which is inclined at an angle from about 45° to about 30° to the axial axis 1, preferably from about 40° to about 33°. The surface section 66 is located to create a space from the conical section 56 of the intermediate member 55 that accommodates the second elastomeric section 22. The second elastomeric section 22 is designed to accommodate tension, compression and shear modes of load but in particular to accommodate compression and shear wherein the vibration isolator 10 is pushed in and to accommodate tension and shear when the vibration isolator 10 is pulled out.

The rigid cap plate 65 is fixedly secured to the inner member 38 by crimping, welding or other suitable, well known methods. The rigid cap plate 65 functions by distributing the load exerted on the vibration support to the second surface 66 wherein the second elastomeric section 22 is compressed against the intermediate member 55. Also, the load is transferred to the first surface 40 which, by being forced downwardly, results in the first elastomeric section incurring a tension mode of load. As shown in FIG. 3, the rigid cap plate 65 may be reinforced by a concentric rigid plate 60 fixedly secured to the rigid cap plate 65. As with the inner and intermediate members, are made from a rigid material such as steel, plastic or aluminum.

The orientation of the first and second elastomeric sections allows for the accommodation of a combination of load modes regardless of positioning. In particular, if an imaginary axis m is drawn through the center of the first and second elastomeric sections to the axial axis 1, the angle of the incline between the imaginary axis and axial axis is from about 45° to about 30°, preferably from about 50° to about 57°. The rubber composition of the first and second elastomeric sections are the same in the present embodiment although in some designs the sections may have different types of elastomeric material. For cosmetic purposes, the second elastomeric section may extend over the intermediate member as shown by 62 in FIG. 3.

While particular embodiments of the invention have been illustrated and described, it will be obvious to those skilled in the art that various changes and modifications may be made without departing from the invention, and it is intended in the appended claims to cover all such changes and modifications that fall within the true spirit and scope of the invention.

What is claimed is:

1. A fully bonded vibration isolator for attaching a support member to a supporting member having an axial axis generally perpendicular to said support and supporting members comprising:
   a rigid inner member adapted for attachment to said supported member and concentric about said axis and having a first surface inclined at an angle from about 30° to about 45° to said axial axis facing the supported member;
   a rigid annular intermediate member adapted for attachment to a supporting member wherein said intermediate member is concentric about said axial axis, and radially outwardly spaced from said inner member, and having a conical section inclined at an angle from about 30° to about 45° to said axial axis towards said supported member;
   an annular first elastomeric section located in said space between said first surface of the inner member and said conical section of said intermediate member, said first elastomeric section is fully bonded to said first surface and said conical section;
   a concentric rigid plate, said plate having a radially outward surface section outwardly spaced from said intermediate member and inclined at an angle from about 30° to about 45° to said axial axis towards said supported member; and
   a second annular elastomeric section located in said space between the surface section of the plate and said conical section of said intermediate member, said second elastomeric section is fully bonded between said surface section and said conical section.

2. A fully bonded vibration isolator for attaching a support member to a supporting member having an axial axis generally perpendicular to said support and supporting members comprising:
   a rigid inner member concentric about said axial axis and having a first surface;

a rigid annular intermediate member which is concentric about said axial axis being radially outwardly spaced therefrom, said intermediate member having a conical section which is spaced outwardly of said first surface;

an annular first elastomeric section located in said space between said first surface of the inner member and said conical section of the intermediate member and said first elastomeric section is fully bonded by press cure to said first surface and said conical section;

a rigid plate having a radial outward surface section which is spaced outwardly of said conical section;

a second annular elastomeric section located in said space between the surface section of the cap plate and said conical section and is fully bonded between the said surface section and said conical section; and an imaginary axis transversing the center of said first elastomeric section and said second annular elastomeric section wherein said imaginary axis from about 45° to about 60° to said axial axis.

3. A fully bonded vibration isolator for attaching a support member to a supporting member having an axial axis generally perpendicular to said support and supporting members comprising:

a rigid inner member having a first surface inclined at an angle from about 30° and about 45° to said axial axis;

a rigid intermediate member outwardly spaced from said inner member, having a conical section inclined at an angle from about 30° and about 45° to said axial axis;

a first elastomeric section located and fully bonded between said first surface of the inner member and said conical section of said intermediate member;

a rigid plate having a radial outward surface section outwardly spaced from said intermediate member inclined at an angle from about 30° and about 45° to said axial axis; and a second elastomeric section located and fully bonded between said conical section and said surface section of the rigid plate wherein said second elastomeric section is secured to said surface section and said conical section.

* * * * *

UNITED STATES PATENT OFFICE
CERTIFICATE OF CORRECTION

PATENT NO. : 5,116,030

DATED : May 26, 1992

INVENTOR(S) : T. J. Nowak et al, Erie, Pa.

It is certified that error appears in the above-identified patent and that said Letters Patent is hereby corrected as shown below:

On the Title page, item [57] col. 2,

IN THE ABSTRACT

Line 8, insert --isolator-- after "vibration".

Signed and Sealed this

Twenty-first Day of December, 1993

Attest:

BRUCE LEHMAN

*Attesting Officer*       *Commissioner of Patents and Trademarks*